US010124398B2

(12) United States Patent
Tamura et al.

(10) Patent No.: US 10,124,398 B2
(45) Date of Patent: Nov. 13, 2018

(54) METHOD FOR PRODUCING A FORGED CRANKSHAFT

(71) Applicant: NIPPON STEEL & SUMITOMO METAL CORPORATION, Tokyo (JP)

(72) Inventors: Kenji Tamura, Takatsuki (JP); Junichi Okubo, Amagasaki (JP); Koichiro Ishihara, Kyoto (JP); Ken Yoshino, Nishinomiya (JP); Kunihiro Yabuno, Matsubara (JP); Hiroyuki Kurokawa, Nishinomiya (JP); Tomohisa Yamashita, Suita (JP); Sho Takamoto, Osaka (JP)

(73) Assignee: NIPPON STEEL & SUMITOMO METAL CORPORATION, Tokyo (JP)

( * ) Notice: Subject to any disclaimer, the term of this patent is extended or adjusted under 35 U.S.C. 154(b) by 176 days.

(21) Appl. No.: 15/031,290

(22) PCT Filed: Nov. 20, 2014

(86) PCT No.: PCT/JP2014/005835
§ 371 (c)(1),
(2) Date: Apr. 22, 2016

(87) PCT Pub. No.: WO2015/075934
PCT Pub. Date: May 28, 2015

(65) Prior Publication Data
US 2016/0256917 A1    Sep. 8, 2016

(30) Foreign Application Priority Data
Nov. 21, 2013 (JP) .................. 2013-240664

(51) Int. Cl.
*B21K 1/00*      (2006.01)
*B21K 1/08*      (2006.01)
(Continued)

(52) U.S. Cl.
CPC ............. *B21K 1/08* (2013.01); *B23P 15/00* (2013.01); *F16C 3/08* (2013.01); *B23P 2700/07* (2013.01); *F16C 2220/46* (2013.01)

(58) Field of Classification Search
CPC .... B21K 1/08; B21J 5/025; F16C 3/08; F16C 2220/46
See application file for complete search history.

(56) References Cited

U.S. PATENT DOCUMENTS 1,403,696 A * 1/1922 Larcher .................... B21K 1/08
29/6.01
2,891,299 A * 6/1959 Robra ...................... B21K 1/08
29/6.01
(Continued)

FOREIGN PATENT DOCUMENTS

JP    2010-230027    10/2010
JP    2012-007726    1/2012

Primary Examiner — Richard Chang
(74) Attorney, Agent, or Firm — Clark & Brody

(57) ABSTRACT

A method for producing a forged crankshaft includes a die forging step, a trimming step, and an excess projecting portion bending step. The die forging step forms a finish forged blank with flash, the finish forged blank including a shape of the crankshaft, in which crank arms have excess projecting portions at outer peripheries of side portions thereof near a crank pin, the excess projecting portions projecting from the outer peripheries. The trimming step removes the flash from the finish forged blank formed in the die forging step. The excess projecting portion bending step bends the excess projecting portions of the crank arms toward a journal-side surface of the crank arm by pressing the crankshaft using a pair of first dies, the crankshaft being obtained by removing the flash in the trimming step.

10 Claims, 7 Drawing Sheets

(51) Int. Cl.
*F16C 3/08* (2006.01)
*B23P 15/00* (2006.01)

(56) References Cited

U.S. PATENT DOCUMENTS

| | | | | |
|---|---|---|---|---|
| 2,911,705 A * | 11/1959 | Vom Bovert | ............ | B21K 1/08 29/6.01 |
| 3,129,488 A * | 4/1964 | Robra | ...................... | B21K 1/08 29/888.08 |
| 3,650,143 A * | 3/1972 | Ruget | ...................... | B21K 1/08 29/6.01 |
| 4,041,755 A * | 8/1977 | Rut | ........................ | B21J 13/025 29/6.01 |
| 4,094,048 A * | 6/1978 | Broder | ..................... | B21K 1/08 29/888.08 |
| 4,306,342 A * | 12/1981 | Hansen | ................... | B21K 1/08 29/888.08 |
| 4,646,551 A * | 3/1987 | Rut | .......................... | B21K 1/08 29/6.01 |
| 6,199,275 B1 * | 3/2001 | Goitsuka | ................... | B21J 5/02 29/888.02 |
| 7,827,684 B2 * | 11/2010 | Heimann | ................. | B21H 7/185 29/888.01 |
| 8,627,565 B2 * | 1/2014 | Ohnuma | .................... | B21J 5/02 29/6.01 |
| 8,813,358 B2 * | 8/2014 | Ohnuma | .................... | B21J 5/02 29/6.01 |
| 9,475,121 B2 * | 10/2016 | Junker | ...................... | B23B 5/18 |
| 9,731,341 B2 * | 8/2017 | Tahira | ...................... | B21K 1/08 |

* cited by examiner

PRIOR ART
FIG. 1
(a) 
(b) 
(c) 
(d) 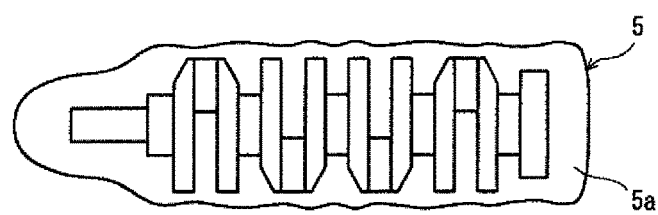
(e) 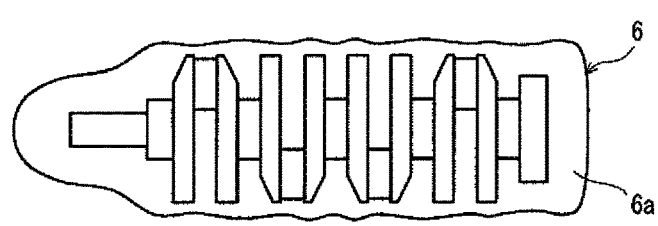
(f) 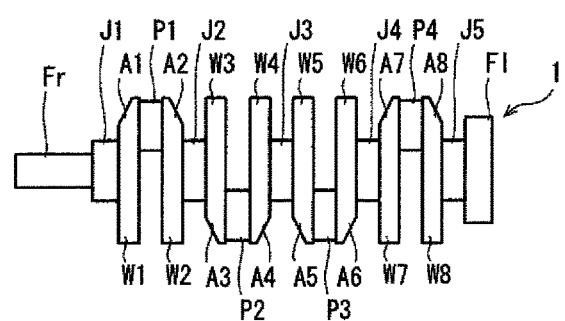

FIG. 6
(a) A-A
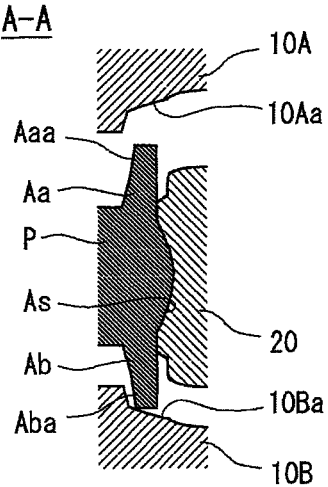
(b) B-B
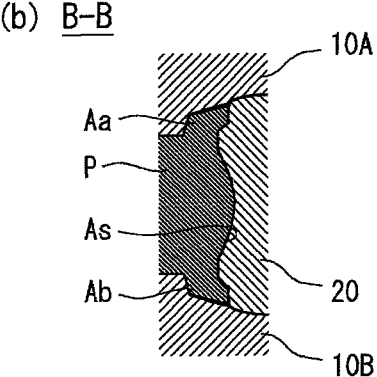

FIG. 8
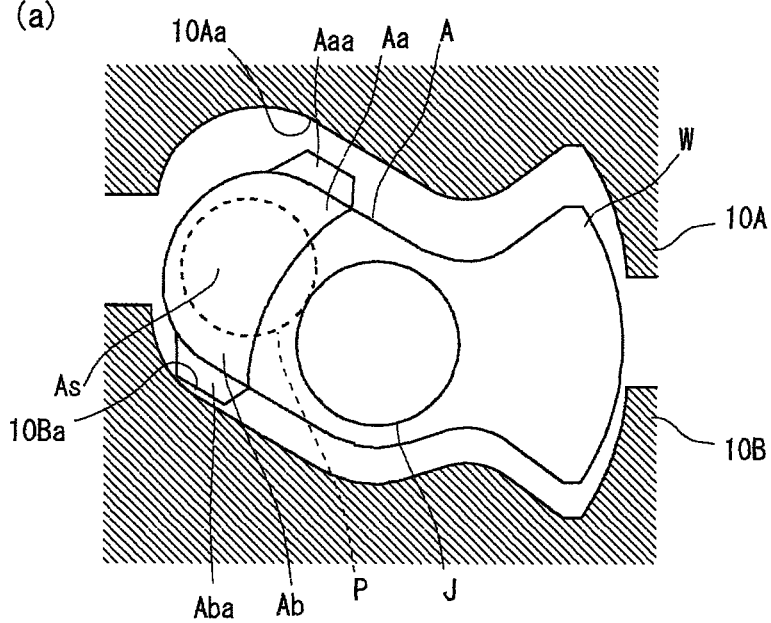
(a)
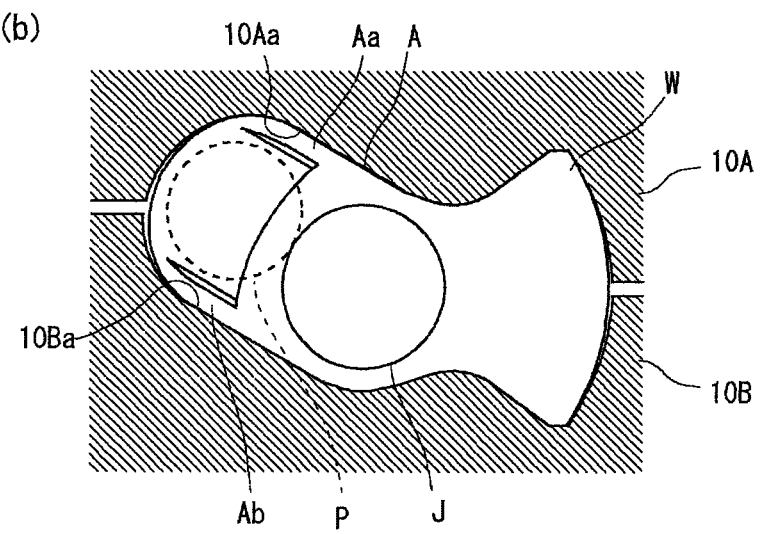
(b)

METHOD FOR PRODUCING A FORGED CRANKSHAFT

TECHNICAL FIELD

The present invention relates to a method for producing a crankshaft by hot forging.

BACKGROUND ART

Reciprocating engines such as those for motor vehicles, motorcycles, agricultural machines, or marine vessels require a crankshaft to extract power by converting reciprocating motion of pistons to rotary motion. Crankshafts are generally categorized into two classes: those of the type produced by die forging and those of the type produced by casting. In particular, in cases where high strength and high stiffness are required, the firstly mentioned forged crankshafts, which are superior in those properties, are often employed.

In general, forged crankshafts are produced by using, as a starting material, a billet having a circular or square cross section and having a constant cross-sectional area over the entire length, and subjecting the billet to the steps of preforming, die forging, trimming and coining in order. Typically, the preforming step includes the steps of roll forming and bending, and the die forging step includes the steps of block forging and finish forging.

FIG. 1 is a schematic diagram illustrating a typical conventional process for producing a forged crankshaft. A crankshaft 1 illustrated in FIG. 1 (see FIG. 1(*f*)) is designed to be mounted in a 4-cylinder engine and includes: five journals J1 to J5; four crank pins P1 to P4; a front part Fr, a flange Fl, and eight crank arms A1 to A8 (hereinafter also referred to simply as "crank arm") that connect the journals J1 to J5 and the crank pins P1 to P4 to each other. The crankshaft 1 is configured such that all of the eight crank arms A1 to A8 are integrally formed with counterweights W1 to W8 (hereinafter also referred to simply as "counterweight"), respectively, and is referred to as a 4-cylinder 8-counterweight crankshaft.

Hereinafter, when the journals J1 to J5, the crank pins P1 to P4, the crank arms A1 to A8, and the counterweights W1 to W8 are each collectively referred to, the reference character "J" is sometimes used for the journals, "P" for the crank pins, "A" for the crank arms, and "W" for the counterweights. A crank pin P and a pair of crank arms A (including the counterweights W) which connect with the crank pin P are also collectively referred to as a "throw".

According to the production method shown in FIG. 1, the forged crankshaft 1 is produced in the following manner. Firstly, a billet 2 shown in FIG. 1(*a*), which has been previously cut to a predetermined length, is heated by an induction heater or a gas atmosphere furnace and then is subjected to roll forming. In the roll forming step, the billet 2 is rolled and reduced in cross section by grooved rolls, for example, to distribute its volume in the longitudinal direction, whereby a rolled blank 3, which is an intermediate material, is formed (see FIG. 1(*b*)). Next, in the bend forging step, the rolled blank 3 obtained by roll forming is partially pressed from a direction perpendicular to the longitudinal direction to distribute its volume, whereby a bent blank 4, which is a secondary intermediate material, is formed (see FIG. 1(*c*)).

Subsequently, in the block forging step, the bent blank 4 obtained by bend forging is press forged with a pair of upper and lower dies, whereby a forged blank 5 including a shape generally resembling the shape of the crankshaft (end product) is formed (see FIG. 1(*d*)). Then, in the finish forging step, the block forged blank 5 obtained by block forging is further processed by press forging the block forged blank 5 with a pair of upper and lower dies, whereby a forged blank 6 including a shape conforming to the shape of the end product crankshaft is formed (see FIG. 1(*e*)). In the block forging and the finish forging, excess material flows out as flash from between the parting surfaces of the dies that oppose each other. Thus, the block forged blank 5 and the finish forged blank 6 have large flash 5*a*, 6*a*, respectively, around the shape of the crankshaft.

In the trimming step, the finish forged blank 6 with the flash 6*a*, obtained by finish forging, is held by the dies from above and below and the flash 6*a* is removed by a cutting die. In this manner, the forged crankshaft 1 is obtained as shown in FIG. 1(*f*). In the coining step, principal parts of the die forged crankshaft 1, from which the flash has been removed, e.g., shaft components such as the journals J, the crank pins P, the front part Fr, and the flange Fl, and further the crank arms A and the counterweights W, are slightly pressed with the dies from above and below and corrected to the size and shape of the end product. In this manner, the forged crankshaft 1 is produced.

The production process shown in FIG. 1 is applicable not only for a 4-cylinder 8-counterweight crankshaft as exemplified, but also for a crankshaft in which, of all eight crank arms A, at least one of the crank arms has the counterweight W. For example, in some crankshafts to be mounted in a 4 cylinder engine, the leading first crank arm A1, the trailing eighth crank arm A8, and the two central fourth and fifth crank arms A4, A5 are each provided with the counterweight W. Such crankshafts are referred to as a 4-cylinder 4-counterweight crankshaft. The same production process can be employed for other types of crankshafts such as those to be mounted in a 3-cylinder engine, an inline 6-cylinder engine, a V-type 6-cylinder engine, or an 8-cylinder engine. When adjustment of the placement angle for the crank pins is necessary, a twisting step is incorporated after the trimming step.

In recent years, there has been a need for weight reduction of reciprocating engines, particularly those for motor vehicles, in order to improve the fuel economy. Accordingly, there is also an ever-increasing demand for weight reduction of crankshafts, which are a principal component of a reciprocating engine. Conventional techniques intended for weight reduction of a forged crankshaft include the following.

Japanese Patent Application Publication No. 2012-7726 (Patent Literature 1) and Japanese Patent Application Publication No. 2010-230027 (Patent Literature 2) each disclose a crank arm having hollow portions greatly and deeply depressed toward a crank pin in the journal-side surface of the crank arm, adjacent to a straight line connecting the axis of the journal to the axis of the crank pin (hereinafter also referred to as the "crank arm centerline"), and they also each disclose a method for producing a crankshaft having the crank arm. The crank arms disclosed in Patent Literatures 1 and 2 are reduced in weight by an amount corresponding to the volumes of the hollow portions. Weight reduction of the crank arm leads to a reduced weight of the counterweight, which forms a pair with the crank arm, and this in turn leads to weight reduction of the forged crankshaft as a whole. Furthermore, the crank arms disclosed in Patent Literatures 1 and 2 have sufficient stiffness (torsional rigidity and flexural rigidity) because the side portions near the crank pin, between which the crank arm centerline is interposed, have a large thickness.

By providing a recess in the journal-side surface of the crank arm while ensuring a large thickness at the side portions of the crank arm as described above, it is possible to achieve weight reduction in combination with sufficient stiffness.

However, forged crankshafts having such a unique shape are difficult to produce using conventional production methods. The reason is that, when the formation of the recess in the surface of the crank arm is to be carried out in the die forging step, a situation will occur in which the draft of the die becomes a reverse draft at the site of the recess and therefore the formed forged blank cannot be removed from the die.

To address such a situation, the production methods disclosed in Patent Literatures 1 and 2 are configured as follows: in the die forging step, the crank arm is shaped to be small without forming the recess in the surface of the crank arm, and after the trimming step, a punch is pressed into the surface of the crank arm so that the mark made by the punch forms the recess.

CITATION LIST PATENT LITERATURE

Patent Literature 1: Japanese Patent Application Publication No. 2012-7726
Patent Literature 2: Japanese Patent Application Publication No. 2010-230027

SUMMARY OF INVENTION

Technical Problem

With either the production method disclosed in Patent Literature 1 or Patent Literature 2, it is possible to form a recess in the journal-side surface of the crank arm while ensuring a large thickness at the side portions of the crank arm, so that a forged crankshaft having reduced weight in combination with sufficient stiffness can be produced.

However, in these methods, in order to form the recess in the surface of the crank arm, the punch is strongly driven into the surface of the crank arm to deform the crank arm as a whole, and therefore a large force for driving the punch is required. Thus, special equipment configuration for imparting a large force to the punch is necessary, and moreover care needs to be taken to the durability of the punch.

An object of the present invention is to provide a method for producing a forged crankshaft capable of conveniently producing a forged crankshaft having reduced weight in combination with sufficient stiffness.

Solution to Problem

A method for producing a forged crankshaft, according to an embodiment of the present invention, is a method for producing a forged crankshaft which includes: journals that define a center of rotation; crank pins that are eccentric with respect to the journals; and crank arms, each of the crank arms connecting a corresponding one of the journals to a corresponding one of the crank pins. The production method includes a die forging step, a trimming step, and an excess projecting portion bending step. The die forging step includes forming a finish forged blank with flash, the finish forged blank including a shape of the crankshaft, wherein the crank arm has an excess projecting portion at an outer periphery of each of side portions near the crank pin, the excess projecting portion projecting from the outer periphery. The trimming step includes removing the flash from the finish forged blank formed in the die forging step. The excess projecting portion bending step includes pressing the crankshaft using a pair of first dies and bending the excess projecting portion of the crank arm toward a surface of the crank arm, the surface being adjacent to the journal, the crankshaft being obtained by removing the flash in the trimming step.

In the above production method, the excess projecting portion bending step may be configured to include: abutting a second die against an area in a surface of the crank arm and holding the area, the surface being adjacent to the journal, the area not including areas of the side portions. When this configuration is employed, the excess projecting portion bending step is preferably configured such that the second die is moved in a direction of the pressing with the first dies so as to follow the pressing with the first dies, so that a position at which the second die is abutted against the crank arm is maintained to be constant.

The above production method may be configured such that the excess projecting portion bending step is performed in a coining step in which a shape of the crankshaft is corrected by pressing using dies.

In the above production method, in the excess projecting portion bending step, the pressing using the pair of first dies may be performed in a direction perpendicular to a direction of eccentricity of the crank pin.

In the above production method, in the excess projecting portion bending step, a recess may be formed inward of the side portions of the crank arm, in the surface of the crank arm, the surface being adjacent to the journal.

Advantageous Effects of Invention

The present invention includes: forming excess projecting portions on the outer peripheries of side portions of the crank arm, the excess projecting portions locally projecting therefrom; and bending the locally projecting excess projecting portions by pressing using first dies. With this configuration, it is possible to form a recess in the journal-side surface of the crank arm while ensuring a large thickness at the side portions of the crank arm, so that a forged crankshaft having reduced weight in combination with sufficient stiffness can be produced. The production can be performed conveniently without the need for a large force because it suffices merely to bend the locally projecting excess projecting portions by pressing.

BRIEF DESCRIPTION OF DRAWINGS

FIG. 1 is a schematic diagram illustrating a typical conventional process for producing a forged crankshaft;

FIG. 2 schematically shows a crank arm of a crankshaft to be produced by a production method according to an embodiment of the present invention, illustrating the shape of the crank arm prior to coining, wherein FIG. 2(a) is a perspective view thereof, FIG. 2(b) is a plan view thereof as seen from the journal region, and FIG. 2(c) is a side view thereof;

3(a) is a perspective view thereof, FIG. 3(b) is a plan view thereof as seen from the journal region, and FIG. 3(c) is a side view thereof;

FIG. 4 schematically illustrates a situation of the coining step in the production method according to the embodiment of the present invention, with plan views of the crank arm as seen from the journal region, wherein FIG. 4(a) shows the state prior to coining and FIG. 4(b) shows the state subsequent to coining;

FIG. 5 schematically illustrates the situation of the coining step in the production method according to the embodiment of the present invention, with side views of the crank arm, wherein FIG. 5(a) shows the state prior to coining and FIG. 5(b) shows the state subsequent to coining;

FIG. 6 schematically illustrates the situation of the coining step in the production method according to the embodiment of the present invention, wherein FIG. 6(a) is a cross-sectional view taken along the line A-A of FIG. 4(a), showing the state prior to coining, and FIG. 6(b) is a cross-sectional view taken along the line B-B of FIG. 4(b), showing the state subsequent to coining;

FIG. 7 schematically illustrates a variation of the configuration for holding the crankshaft, wherein FIG. 7(a) is a plan view of the crank arm as seen from the journal region and FIG. 7(b) is a side view of the crank arm; and FIG. 8 schematically illustrates a situation of the coining step in a production method according to another embodiment of the present invention, with plan views of the crank arm as seen from the journal region, wherein FIG. 8(a) shows the state prior to coining and FIG. 8(b) shows the state subsequent to coining.

DESCRIPTION OF EMBODIMENTS

Embodiments of the method of the present invention for producing a forged crankshaft will now be described in detail.

An embodiment of the method of the present invention for producing a forged crankshaft employs the production process as shown in FIG. 1. Specifically, the production method according to the present embodiment includes: a preforming step (roll forming and bend forging), a die forging step (block forging and finish forging), a trimming step, and a coining step, each being performed by hot working. In particular, the production method according to the present embodiment is distinguished over the conventional production method shown in FIG. 1 by the modes of the die forging step and the coining step.

1. Crank Arm Shape of Crankshaft

Figure 2:
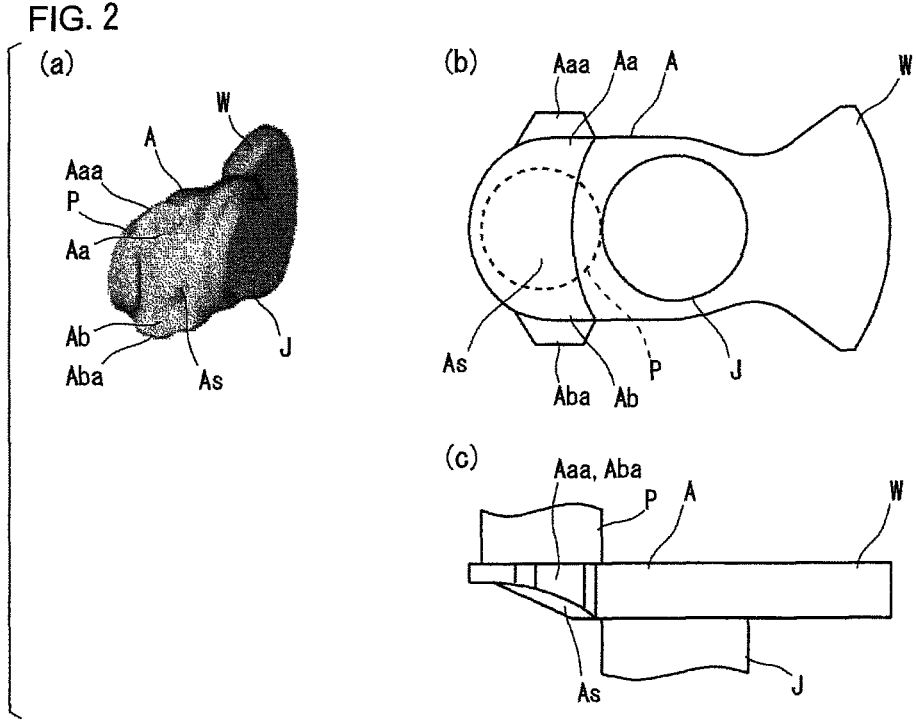
Figure 3:
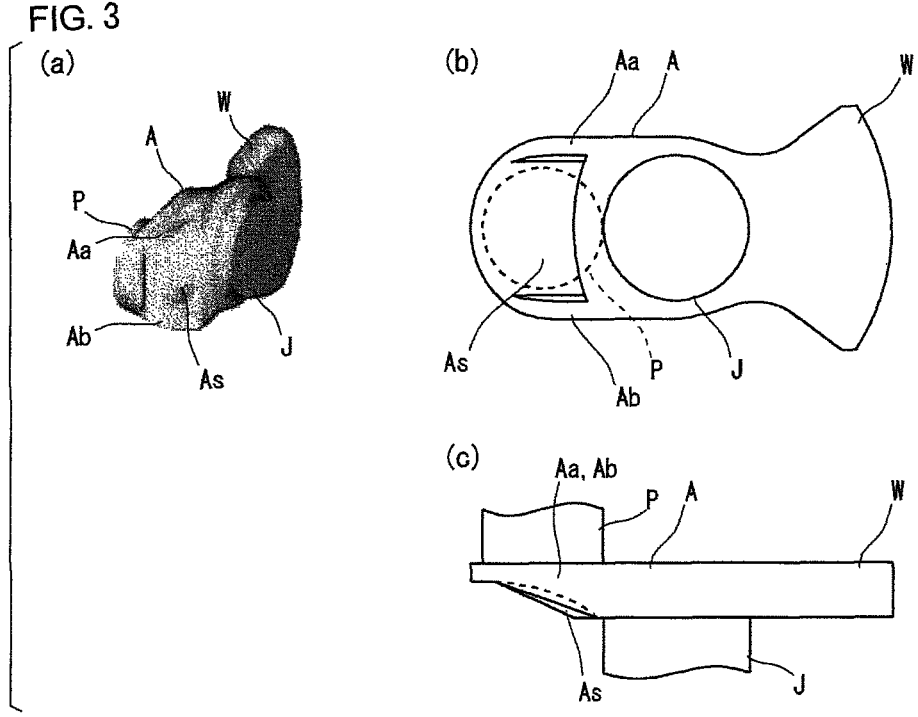
FIG. 3 schematically shows the crank arm of the crankshaft to be produced by the production method according to the embodiment of the present invention, illustrating the shape of the crank arm subsequent to coining, wherein FIG.

FIG. 2 schematically shows a crank arm of a crankshaft to be produced by a production method according to an embodiment of the present invention, illustrating the shape of the crank arm prior to coining FIG. 3 schematically shows the crank arm of the crankshaft to be produced by the production method according to the embodiment of the present invention, illustrating the shape of the crank arm subsequent to coining. Both FIG. 2 and FIG. 3 show a representative example of the crank arms (including a counterweight) of the crankshaft, wherein FIGS. 2(a) and 3(a) are perspective views thereof, FIGS. 2(b) and 3(b) are plan views thereof as seen from the journal region, and FIGS. 2(c) and 3(c) are side views thereof.

As shown in FIG. 3, the shape of the crank arm of the forged crankshaft, which is the end product of the present embodiment, i.e., the shape of the crank arm subsequent to coining is such that the side portions Aa, Ab, near the crank pin P, of the crank arm A protrude to the journal J-side and therefore the side portions Aa, Ab have a large thickness. Furthermore, the shape of the crank arm is such that a recess is provided in an area As inside the side portions Aa, Ab in the journal J-side surface of the crank arm A.

In short, the shape of the crank arm subsequent to coining is such that a large thickness is provided at the side portions Aa, Ab of the crank arm A while a recess is formed in the journal J-side surface of the crank arm A. The forged crankshaft having the crank arm of such a shape has reduced weight by virtue of the recess in the surface of the crank arm A and also has sufficient stiffness because a large thickness is provided at the side portions Aa, Ab of the crank arm A.

In contrast, as shown in FIG. 2, the shape of the crank arm prior to coining is such that, in the journal J-side surface of the crank arm A, a recess is provided in the area As inward of the side portions Aa, Ab in such a manner that the recess conforms to the shape of the end product subsequent to coining. The recess smoothly extends to the regions of the side portions Aa, Ab of the crank arm A. Thus, the shape of the crank arm is such that the thicknesses of the side portions Aa, Ab are smaller than those in the end product. Further, the side portions Aa, Ab of the crank arm A have excess projecting portions Aaa, Aba formed on the respective outer peripheries so as to project from the outer peripheries. The excess projecting portions Aaa, Aba have a plate shape extending along the outer peripheries of the side portions Aa, Ab of the crank arm A, and have thicknesses substantially equal to the thicknesses of the side portions Aa, Ab of the crank arm A or smaller than those.

This shape of the crank arm prior to coining is finally formed by finish forging in the die forging step and retained in the trimming step.

2. Method for Producing Forged Crankshaft

As described above, the production method according to the present embodiment includes the preforming step, the die forging step, the trimming step, and the coining step, each being performed sequentially by hot working. When adjustment of the placement angle for the crank pins is necessary, a twisting step is incorporated subsequent to the trimming step and prior to the coining step.

In the production method according to the present embodiment, similarly to the conventional production method shown in FIG. 1, the preforming step is performed to form a bent blank Next, the die forging step (block forging and finish forging) is performed to form a finish forged blank with flash from the bent blank, the finish forged blank including the shape of the crankshaft in which the crank arm has the shape shown in FIG. 2. Both die forging operations, i.e., block forging and finish forging, are carried out with press forging using paired upper and lower dies.

It should be noted that the shape of the crankshaft included in the finish forged blank is such that a recess has been formed in the journal J-side surface of the crank arm A and the plate-shaped excess projecting portions Aaa, Aba have been formed on the outer peripheries of the side portions Aa, Ab of the crank arm A as described above. The recess smoothly extends to the areas of the side portions Aa, Ab of the crank arm A, and the excess projecting portions Aaa, Aba have thicknesses substantially equal to the thicknesses of the side portions Aa, Ab or smaller than those. The dies used in the die forging carry impressions reflecting the shapes of them, and the drafts of the dies do not become reverse drafts either at the site corresponding to the recess in the surface of the crank arm or at the sites corresponding to the excess projecting portions Aaa, Aba on the outer peripheries of the crank arm. As a result, the die forging can be carried out without difficulty.

Subsequently, the trimming step is performed to trim the flash from the finish forged blank with flash, thereby obtaining the forged crankshaft. The crankshaft obtained by the trimming step has the crank arm shape shown in FIG. 2, with the excess projecting portions Aaa, Aba formed on the outer peripheries of the side portions Aa, Ab of the crank arm A.

Then, the process proceeds to the coining step.

Figure 4:
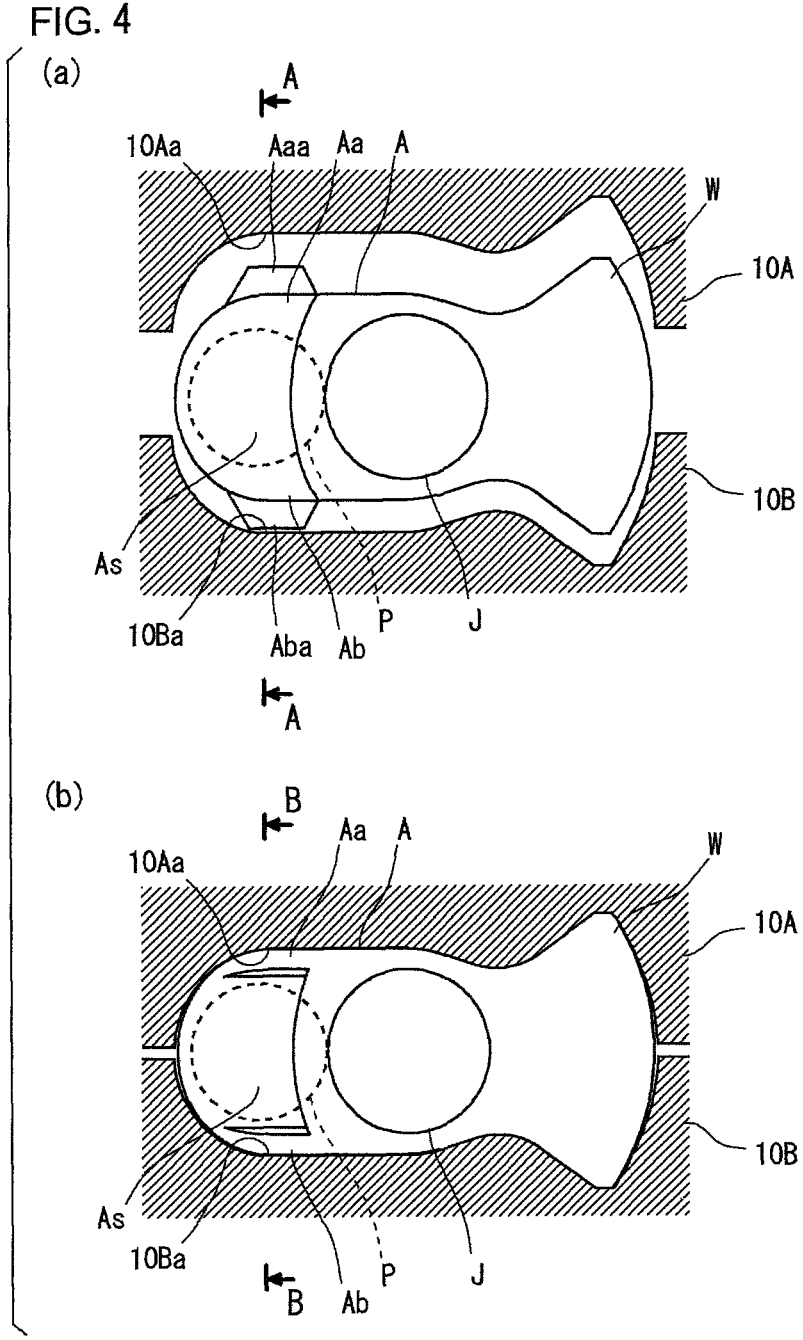
Figure 5:
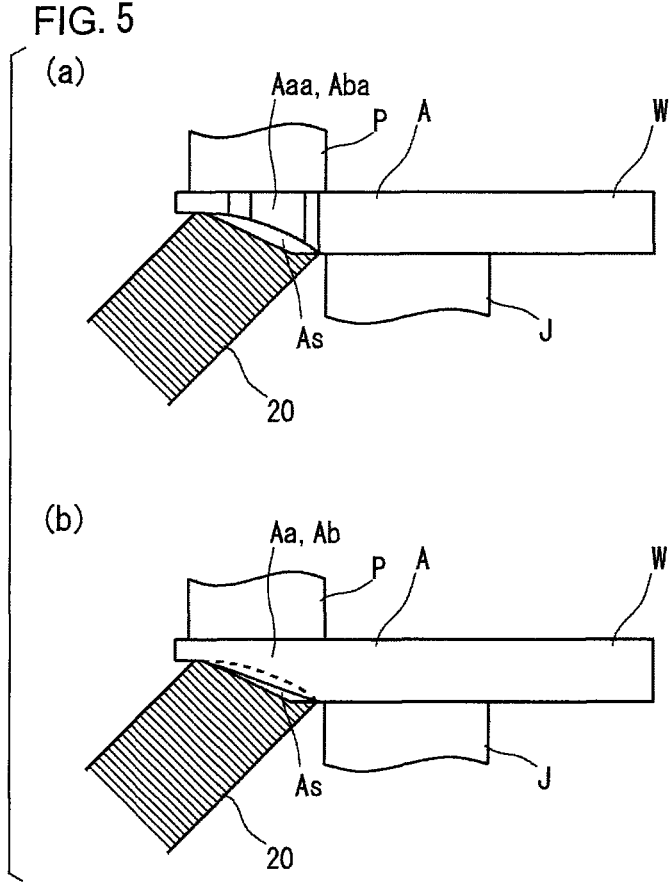

FIGS. 4 to 6 schematically illustrate the situation of the coining step in the production method according to the embodiment of the present invention, wherein FIGS. 4(a), 5(a), and 6(a) show the state prior to coining and FIGS. 4(b), 5(b), and 6(b) show the state subsequent to coining. Of these figures, FIG. 4 shows plan views of the crank arm as seen from the journal region, and FIG. 5 shows side views of the crank arm. FIG. 6(a) is a cross-sectional view taken along the line A-A of FIG. 4(a) and FIG. 6(b) is a cross-sectional view taken along the line B-B of FIG. 4(b). In the plan views of FIG. 4 and the side views of FIG. 5, the dies are shown in cross section.

As shown in FIG. 4(a) and FIG. 6(a), in the coining step, paired upper and lower dies 10A, 10B (hereinafter also referred to as "first dies" 10A, 10B for convenience of description) are used as with a typical conventional coining step. The first dies 10A, 10B carry impressions that reflect the shape of the crankshaft end product having the crank arm shape shown in FIG. 3. The upper first die 10A moves toward the lower first die 10B so as to press the crankshaft in a direction perpendicular to the direction of eccentricity of the crank pins P. The direction of pressing is also perpendicular to the axial direction of the crankshaft.

As shown in FIG. 5(a) and FIG. 6(a), the first dies 10A, 10B are open at the sites corresponding to the recess in the journal J-side surface of the crank arm A, and the second die 20 is accommodated at the open sites. The second die 20 carries an impression having a shape corresponding to that of the recess in the surface of the crank arm. The second die 20 is independent of the first dies 10A, 10B and is movable back and forth so as to be in contact with or away from the recess in the surface of the crank arm. The back and forth movement of the second die 20 is carried out by a hydraulic cylinder coupled to the second die 20 or by another means. In addition, the second die 20 is also movable in the direction of pressing with the first dies 10A, 10B, i.e., in the direction perpendicular to the direction of eccentricity of the crank pins P. The movement of the second die 20 in the direction of pressing is carried out using a suitable means such as a spring or a hydraulic cylinder provided separately from the drive source for the back and forth movement. In this case, the configuration may be such that the die 20 itself alone is movable upwardly and downwardly or the configuration may be such that the second die 20 is movable upwardly and downwardly integrally with the hydraulic cylinder or by another means that causes the back and forth movement of the second die 20.

The coining step of the present embodiment using such first dies 10A, 10B and second die 20 is carried out in the following manner. Firstly, the crankshaft after trimming is placed in the impressions of the lower first die 10B. During this time, as shown in FIG. 4(a), the lower excess projecting portion Aba of the excess projecting portions Aaa, Aba on the outer peripheries of the crank arm is in contact with the impression of the lower first die 10B.

Then, the second die 20 is advanced and the second die 20 is abutted against the journal J-side surface of the crank arm A as shown in FIG. 5(a) and FIG. 6(a). During this time, the second die 20 is abutted against the surface of the recess area As excluding the areas of the side portions Aa, Ab in the journal J-side surface of the crank arm A.

In this state, the upper first die 10A is moved toward the lower first die 10B. In this manner, the shaft components of the crankshaft (e.g., the journals J, the crank pins P, the front part Fr, and the flange F1), and further the crank arms A and the counterweights W are slightly pressed and corrected to the size and shape of the end product.

During the pressing with the first dies 10A, 10B, the excess projecting portions Aaa, Aba on the outer peripheries of the side portions Aa, Ab of the crank arm A are gradually bent toward the journal J-side surface by the surfaces 10Aa, 10Ba of the impressions of the first dies 10A, 10B, which respectively contact the side portions, as shown in FIGS. 4(b), 5(b) and 6(b). The surfaces 10Aa, 10Ba of the first dies 10A, 10B, which contribute to the bending of the excess projecting portions Aaa, Aba, are inclined so as to guide the excess projecting portions Aaa, Aba toward the journal J-side surface. Consequently, the side portions Aa, Ab of the crank arm A protrude to the journal J-side surface by amounts corresponding to the volumes of the excess projecting portions Aaa, Aba. In this manner, the crankshaft, which has a large thickness at the side portions Aa, Ab of the crank arm A and has the recess formed in the journal J-side surface of the crank arm A as shown in FIG. 3, is produced. More specifically, as shown in FIG. 6(b), the crank arm A has a large thickness at the side portions Aa, Ab, a thin thickness inward thereof because of the recess, and a large thickness further inward thereof.

During the pressing, the second die 20 moves in the direction of the pressing so as to follow the pressing with the first dies 10A, 10B so that the position of abutment against the crank arm A is maintained to be constant without variation. The crank arm A is constrained by the second die 20 abutted against the recess area As in the journal J-side surface, and therefore the shape of the recess area As is stabilized. Furthermore, the side portions Aa, Ab of the crank arm A protrude to the journal J-side as a result of the pressing with the first dies 10A, 10B, and the shape of the protrusions is precisely formed by the second die 20.

After the pressing, the second die 20 is retracted to be withdrawn from the crank arm A, and thereafter, the upper first die 10 A is raised to take out the crankshaft.

As described above, with the production method of the present embodiment, it is possible to form the recess in the journal J-side surface of the crank arm A while ensuring the large thickness at the side portions Aa, Ab of the crank arm A, so that a forged crankshaft having reduced weight in combination with sufficient stiffness can be produced. With this production method, it suffices merely to form the locally projecting excess projecting portions Aaa, Aba on the outer peripheries of the side portions Aa, Ab of the crank arm A and bend the locally projecting excess projecting portions Aaa, Aba by pressing using the first dies 10A, 10B. Accordingly, the crankshaft production of the present embodiment can be performed conveniently without the need for a large force.

In particular, in the present embodiment, although the second die 20 is abutted against the surface of the crank arm A, the second die 20 is not pressed into the surface any further, and therefore merely a small force is sufficient to hold the second die 20. Furthermore, according to the present embodiment, the formation of the final shape of the crank arm A is accomplished simply by bending the excess thickness portions Aaa, Aba, and therefore the deformation has little influence on the other components such as the journals.

Furthermore, according to the present embodiment, the bending of the excess projecting portions Aaa, Aba on the outer peripheries of the crank arm is carried out in the coining step, and therefore modification to the conventional production method is not necessary. It is noted, however, that the bending of the excess projecting portions Aaa, Aba on the outer peripheries of the crank arm may be performed in a separate step distinct from the coining step as long as it is performed after the trimming step.

The present invention is not limited to the embodiments described above, but may be modified in various ways without departing from the spirit and scope of the present invention. For example, the second die 20 may not be necessary. This is because, when precise dimensional accuracy of the crank arm A is not required, the second die 20 may not be necessary because the bending of the excess projecting portions Aaa, Aba on the outer peripheries of the crank arm using the first dies 10A, 10B can form the recess in the journal J-side surface of the crank arm A while ensuring a large thickness of the side portions Aa, Ab of the crank arm A.

Figure 7:
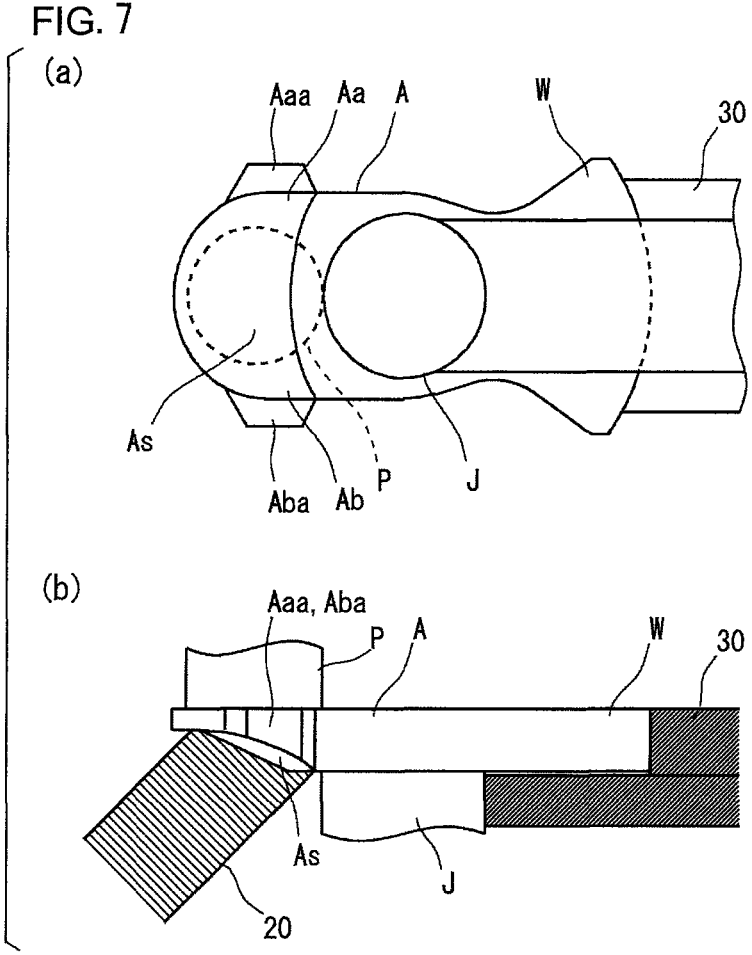

In the above embodiment, the procedure employed is as follows: the crankshaft after trimming is placed in the lower first die 10B and then the second die 20 is advanced to hold the crank arm A of the crankshaft. Alternatively, the following procedure may be employed: the second die 20 is advanced to hold the crankshaft which has undergone trimming and then the crankshaft is placed in the lower first die 10B integrally with the second die 20. In this case, as shown in FIG. 7 for example, the configuration may be such that a third die 30 is arranged at a position opposite from the second die 20 with the axis of the crankshaft interposed therebetween in a horizontal direction, and the third die 30 is advanced along the direction of eccentricity of the crank pins P upon advancement of the second die 20 so that the third die 30 holds the outer periphery of the counterweight W and the outer periphery of the journal J. The third die 30 may hold the crankshaft exclusively at the outer periphery of the counterweight W or exclusively at the outer periphery of the journal J.

The production method of the present embodiment is applicable not only to production of a crankshaft to be mounted in a 4-cylinder engine (hereinafter referred to as a "4-cylinder crankshaft") but also to production of crankshafts to be mounted in a 3-cylinder engine, an inline 6-cylinder engine, a V-type 6-cylinder engine, and other types of engines (hereinafter referred to as "3-cylinder and other types of crankshafts"). In 3-cylinder and other types of crankshafts, the positions of the crank pins are equidistantly varied about the rotation axis (journals) at an angle of 120° or 60°. Thus, in the process of producing 3-cylinder and other types of crankshafts, a twisting step may be incorporated subsequent to the trimming step and prior to the coining step depending on the shape of the counterweight. On the other hand, in a 4-cylinder crankshaft, the positions of the crank pins are equidistantly varied at an angle of 180°. Thus, the process of producing a 4-cylinder crankshaft does not require a twisting step.

The above embodiment particularly illustrates a situation in which a 4-cylinder crankshaft is produced. In the coining step, a 4-cylinder crankshaft is placed in such a manner that all the crank pins are eccentrically disposed in a horizontal direction. Thus, the direction of the pressing with the first dies is a direction perpendicular to the direction of eccentricity of the crank pins as described above.

However, the direction of the pressing with the first dies is not limited to the direction of eccentricity of the crank pins. For example, in the case of a crankshaft to be mounted in a 3-cylinder engine (hereinafter referred to as a "3-cylinder crankshaft"), in the coining step, none of the crank pins are disposed so as to be eccentric in a horizontal direction. This also applies to a crankshaft to be mounted in an inline 6-cylinder engine. In the case of a crankshaft to be mounted in a V-type 6-cylinder engine, in the coining step, one or more crank pins are disposed so as to be eccentric in a horizontal direction while one or more crank pins are not disposed so as to be eccentric in the horizontal direction. Thus, in production of 3-cylinder and other types of crankshafts, for one or more of the crank pins, the direction of the pressing with the first dies is not a direction perpendicular to the direction of eccentricity of the crank pins. Such a situation is described below.

FIG. 8 schematically illustrates the situation of the coining step in a production method according to another embodiment of the present invention, wherein FIG. 8(*a*) shows the state prior to coining and FIG. 8(*b*) shows the state subsequent to coining FIG. 8 shows plan views of the crank arm as seen from the journal region. In FIG. 8, the dies are shown in cross section. FIG. 8 shows a coining step for a 3-cylinder crankshaft by way of example.

In a 3-cylinder crankshaft, the positions of the crank pins P are equidistantly varied at an angle of 120°. Thus, as shown in FIG. 8, the direction of eccentricity of one or more of the crank pins P is offset relative to the horizontal direction by 30°. In this case, as shown in FIGS. 8(*a*) and 8(*b*), the direction of the pressing with the upper first die 10A is offset from the direction of eccentricity of the crank pin P by 60°. Even in this case, as with the above embodiment, the excess projecting portions Aaa, Aba can be bent by the first dies 10A, 10B. In short, the direction of the pressing with the first die is not limited as long as the bending of the excess projecting portions Aaa, Aba can be accomplished.

INDUSTRIAL APPLICABILITY

The present invention is capable of being effectively utilized in production of forged crankshafts to be mounted in a variety of reciprocating engines.

REFERENCE SIGNS LIST

1: forged crankshaft
J, J1 to J5: journal
P, P1 to P4: crank pin
Fr: front part
F1: flange
A, A1 to A8: crank arm
W, W1 to W8: counterweight
Aa, Ab: side portion of crank arm
As: area inward of side portions in journal-side surface of crank arm
Aaa, Aba: excess projecting portion
10A, 10B: first die
10Aa, 10Ba: portion of surface of impression of first die
20: second die
30: third die

The invention claimed is:

1. A method for producing a forged crankshaft, the crankshaft including: journals that define a center of rotation; crank pins that are eccentric with respect to the journals; and crank arms, each of the crank arms connecting a corresponding one of the journals to a corresponding one of the crank pins, the method comprising:
- a die forging step, including forming a finish forged blank with flash, the finish forged blank including a shape of the crankshaft, wherein the crank arm has an excess projecting portion at an outer periphery of each of side portions near the crank pin, the excess projecting portion projecting from the outer periphery;
- a trimming step, including removing the flash from the finish forged blank formed in the die forging step; and
- an excess projecting portion bending step, including pressing the flash-removed finish forged blank using a pair of first dies and bending the excess projecting portion of the crank arm toward a surface of the crank arm, the surface being adjacent to the journal.

2. The method for producing a forged crankshaft according to claim 1,
wherein, in the excess projecting portion bending step, a second die is abutted against an area in the surface of the crank arm to hold the area, the surface being adjacent to the journal, the area not including areas of the side portions.

3. The method for producing a forged crankshaft according to claim 2,
wherein, in the excess projecting portion bending step, a recess is formed inward of the side portions of the crank arm, in the surface of the crank arm, the surface being adjacent to the journal.

4. The method for producing a forged crankshaft according to claim 2,
wherein, in the excess projecting portion bending step, the second die is moved in a direction of the pressing with the first dies so as to follow the pressing with the first dies, so that a position at which the second die is abutted against the crank arm is maintained to be constant.

5. The method for producing a forged crankshaft according to claim 4,
wherein, in the excess projecting portion bending step, a recess is formed inward of the side portions of the crank arm, in the surface of the crank arm, the surface being adjacent to the journal.

6. The method for producing a forged crankshaft according to claim 1,
wherein the excess projecting portion bending step is performed in a coining step in which a shape of the crankshaft is corrected by pressing using dies.

7. The method for producing a forged crankshaft according to claim 6,
wherein, in the excess projecting portion bending step, a recess is formed inward of the side portions of the crank arm, in the surface of the crank arm, the surface being adjacent to the journal.

8. The method for producing a forged crankshaft according to claim 1,
wherein, in the excess projecting portion bending step, the pressing using the pair of first dies is performed in a direction perpendicular to a direction of eccentricity of the crank pin.

9. The method for producing a forged crankshaft according to claim 8,
wherein, in the excess projecting portion bending step, a recess is formed inward of the side portions of the crank arm, in the surface of the crank arm, the surface being adjacent to the journal.

10. The method for producing a forged crankshaft according to claim 1,
wherein, in the excess projecting portion bending step, a recess is formed inward of the side portions of the crank arm, in the surface of the crank arm, the surface being adjacent to the journal.

* * * * *